US011369229B2

(12) United States Patent
Morello

(10) Patent No.: US 11,369,229 B2
(45) Date of Patent: Jun. 28, 2022

(54) GRILLING MACHINE

(71) Applicant: Morello Forni di Morello Marco & C. S.A.S., Ceranesi (IT)

(72) Inventor: Mairo Morello, Ceranesi (IT)

(73) Assignee: Morello Forni di Morello Marco & C. S.A.S., Ceranesi (IT)

(*) Notice: Subject to any disclaimer, the term of this patent is extended or adjusted under 35 U.S.C. 154(b) by 38 days.

(21) Appl. No.: 15/766,550

(22) PCT Filed: Sep. 29, 2016

(86) PCT No.: PCT/IB2016/055832
§ 371 (c)(1),
(2) Date: Apr. 6, 2018

(87) PCT Pub. No.: WO2017/060798
PCT Pub. Date: Apr. 13, 2017

(65) Prior Publication Data
US 2018/0310761 A1 Nov. 1, 2018

(30) Foreign Application Priority Data

Oct. 8, 2015 (IT) .......................... 102015000059702

(51) Int. Cl.
A47J 37/04 (2006.01)
F24C 14/00 (2006.01)
F24C 15/14 (2006.01)
F24C 15/20 (2006.01)
A47J 37/07 (2006.01)
A21B 1/44 (2006.01)
(Continued)

(52) U.S. Cl.
CPC ............... *A47J 37/043* (2013.01); *A21B 1/44* (2013.01); *A47J 37/0754* (2013.01);
(Continued)

(58) Field of Classification Search
CPC .............. F24C 15/2028; F24C 15/2042; F24C 15/205; F24C 15/20; A47J 37/0754
See application file for complete search history.

(56) References Cited

U.S. PATENT DOCUMENTS 3,260,189 A    7/1966 Jensen
3,303,839 A *  2/1967 Tavan ................. F24C 15/2028
                                                126/299 D
(Continued)

OTHER PUBLICATIONS

International Search Report for corresponding PCT Application No. PCT/IB2016/055832 dated Dec. 9, 2016 (6 pages).

Primary Examiner — John J Norton
(74) Attorney, Agent, or Firm — Greer, Burns & Crain, Ltd.

(57) ABSTRACT

A grilling machine is described, which comprises a base body, a plate, arranged on the base body and defining a cooking surface whereon foods to be cooked are laid, and heating means operationally associated with the plate for heating the cooking surface. There is also a circuit, associated with the plate, for treating the fumes produced during the food cooking process. The fumes treatment circuit comprises: a hood arranged above the plate, which comprises at least one suction mouth, a filtering unit fluidically connected to the hood, and at least one recirculation outlet fluidically connected downstream of the filtering unit and located near the plate. In this manner, the cooking fumes sucked in through the suction mouth of the hood are treated by the filtering unit in order to obtain a purified flow with a given percentage of humidity. The purified flow is then recirculated towards the cooking surface through the recirculation outlet in order to exert a humidifying action on the foods.

18 Claims, 4 Drawing Sheets

(51) Int. Cl.
    *B01D 46/00*     (2022.01)
    *B01D 53/04*     (2006.01)
    *B03C 3/28*     (2006.01)
    *B03C 3/41*     (2006.01)
    *B03C 3/45*     (2006.01)

(52) U.S. Cl.
    CPC ...... *A47J 37/0786* (2013.01); *B01D 46/0032* (2013.01); *B01D 46/0038* (2013.01); *B01D 53/04* (2013.01); *B03C 3/28* (2013.01); *B03C 3/41* (2013.01); *B03C 3/45* (2013.01); *F24C 14/005* (2013.01); *F24C 15/14* (2013.01); *F24C 15/2028* (2013.01); *F24C 15/2042* (2013.01); *B01D 2253/102* (2013.01); *B01D 2253/108* (2013.01)

(56) References Cited

U.S. PATENT DOCUMENTS

| | | | | |
|---|---|---|---|---|
| 3,593,728 A * | 7/1971 | Sauer | ........................ | B08B 3/10 134/96.1 |
| 3,933,145 A | 1/1976 | Reich | | |
| 4,947,741 A * | 8/1990 | Gongwer | ............... | A47J 37/044 99/345 |
| 5,042,456 A * | 8/1991 | Cote | .................... | F24C 15/2028 126/299 D |
| 6,621,058 B1 * | 9/2003 | Kim | ..................... | H05B 6/6429 219/757 |
| 2003/0072675 A1 * | 4/2003 | Takeda | ..................... | A61L 9/22 422/22 |
| 2004/0231657 A1 * | 11/2004 | Cheon | ................. | F24C 15/2028 126/299 R |
| 2006/0278216 A1 * | 12/2006 | Gagas | ................. | F24C 15/2028 126/299 D |
| 2007/0158332 A1 * | 7/2007 | Stewart | ..................... | F24C 7/08 219/443.1 |
| 2008/0202491 A1 | 8/2008 | Eberhard | | |
| 2010/0193500 A1 * | 8/2010 | Moreth, III | ............... | A21B 1/10 219/402 |
| 2013/0125764 A1 * | 5/2013 | Jeong | ................. | F24C 15/2035 99/357 |
| 2013/0199511 A1 * | 8/2013 | Laessig | ................. | F24C 14/00 126/369 |
| 2015/0335200 A1 * | 11/2015 | Ortner | ................. | A47J 37/067 99/425 |

\* cited by examiner

GRILLING MACHINE

This application is a United States National Stage Application under 35 U.S.C. Section 371 of International Patent Application No. PCT/IB2016/055832 filed on Sep. 29, 2016, claiming priority to Italian Patent Application No. 102015000059702 filed on Oct. 8, 2015, both of which are hereby incorporated by reference as if fully set forth herein.

FIELD OF THE INVENTION

The present invention relates to a grilling machine that allows cooking food products, typically, but not necessarily, for exposed cooking applications.

BRIEF SUMMARY OF THE BACKGROUND ART

Barbecues are known in the art, which are portable machines for cooking food products. They mainly consist of a plate or grill whereon the foods to be cooked are laid. Cooking occurs by contact with the plate or grill, which is heated by electricity or coal/firewood or gas.

Barbecues suffer from some limitations as concerns the food cooking technique and the treatment of the fumes, which are dispersed into the environment or through evacuation systems consisting of a chimney flue applied to a hood. Therefore, they are limited as regards their use in indoor or poorly ventilated environments.

With reference to the above, it must also be pointed out that the fumes evacuation systems commonly in use are subject to some problems as well. In fact, chimney flues impregnated with cooking fats in the presence of unburnt substances are often a cause for fires that cannot be easily extinguished, unless adequate and costly firefighting systems are available.

SUMMARY OF THE INVENTION

It is therefore one object of the present invention to provide a grilling machine which can also be used within indoor environments and which can treat the cooking fumes.

It is another object of the present invention to provide a grilling machine which can overcome di drawbacks of prior-art cooking machines.

It is a further object of the present invention to provide a grilling machine which is economical and simple to manufacture.

These and other objects are achieved through a grilling machine that comprises:
  a base body;
  a plate, arranged on said base body, which defines a cooking surface whereon foods to be cooked are laid;
  heating means operationally associated with said plate for heating said cooking surface;
  a circuit, associated with said plate, for treating fumes produced while cooking said foods;
  wherein said fumes treatment circuit comprises:
  a hood arranged over said plate, comprising at least one suction mouth;
  a filtering unit fluidically connected to said hood;
  at least one recirculation outlet fluidically connected downstream of said filtering unit and located near said plate;
  so that the cooking fumes sucked in through said suction mouth of the hood are treated by said filtering unit in order to obtain a purified flow with a given percentage of humidity, wherein said purified flow is recirculated towards said cooking surface through said at least one recirculation outlet in order to exert a humidifying action on the foods.

Thus, aiming at reducing the dispersion into an indoor environment of greasy fumes and odours produced by foods being cooked on the cooking plate, the fumes treatment circuits allow the machine to be used without it requiring a connection to costly fumes evacuation systems.

The obtainment of a primary flow of burnt gas without greasy substances produced by the cooking process is a remarkable advantage in terms of exhaust gas quantity and quality, which eliminates the energy consumption, maintenance and cleaning of additional extraction equipment, while also taking up less room.

Advantageously, said hood is shaped as a bridge and is positioned radially over said plate. In particular, said filtering unit comprises:
  a first filtering module adapted to filter greasy fluids produced by the cooking process;
  and a second filtering module, which in turn comprises a set of filters adapted to absorb odours and purify the air, to be reintroduced into the recirculation circuit of the machine.

Preferably, said first filtering module comprises filters selected from:
  impact filters,
  wire mesh filters,
  pleated and/or panel-type filtering septa made of fiber;
  or a combination thereof.

Preferably, said second filtering module comprises activated charcoal or zeolite filters or the like.

Advantageously, said filtering unit comprises a third filtering module as an addition or an alternative to said second filtering module, which comprises an electrostatic filtering cell block equipped with a ionization section and a collector cell, for filtering said cooking fumes in a continuous and fine manner.

In particular, a centrifugal aspirator associated with said filtering unit sucks in said cooking fumes and then recirculates said purified flow downstream of said filtering unit through said recirculation outlet.

Advantageously, said heating means comprise a heating chamber obtained from a perforated rotary tub that comprises a rotary joint, wherein said heating chamber houses electric resistors, or an autonomous induction heating system, or a gas burner, so that said resistors will stay in a fixed position, while said cooking plate and the heating chamber will be free to rotate about an axis defined by said rotary joint.

As an alternative to or in combination with the above, said heating means may comprise a gas burner in the "combustion" version using charcoal, firewood or other fuels of vegetable nature or pellets or liquids, such as alcohol, of various nature.

Preferably, said cooking plate has a lenticular shape. The lenticular shape will allow the greasy substances generated as food is cooked to drain towards an outer edge of the plate. In particular, said plate comprises a channel for recirculating and collecting the liquids produced during the cooking process, formed perimetrically at the edge.

In particular, there is a recirculation circuit associated with said recirculation and collection channel. Said recirculation circuit comprises:
  a delivery collector fluidically connected to said recirculation channel;
  a first collection tank containing a detergent liquid;
  a pump associated with said first tank and adapted to deliver a flow of detergent liquid into said recirculation and collection channel;

a return collector fluidically connected to said recirculation channel for collecting the cooking liquid mixed with said detergent liquid;

a second collection tank for collecting said cooking liquid and said detergent liquid.

Advantageously, in a preferred embodiment a single tank comprises two distinct chambers that define said first and second tanks.

In particular, there is also a drain pipe acting as an overflow device, positioned and levelled in such a way as to operate by gravity, and connected to said tank. In this manner, the drain pipe will prevent any malfunctions deriving from a clogged intake and delivery circuit of the recirculation pump, which might cause an undesired increase in the level of the water in the recirculation channel.

Said lenticular cooking plate is advantageously a rotary one, to allow easier management by the operator and uniform distribution of the heat on the plate surface. The foods being cooked will thus be all hit evenly by the purified humidifying air flow, leading to improved food cooking and flavour.

Advantageously, said grilling machine can be functionally inserted into an oven such as, for example, the one described in U.S. Pat. No. 1,363,393 filed by the present Applicant.

This makes it possible to obtain a rotary bedplate inside the oven, which is virtually sealed with respect to the oven chamber. The advantage that this provides is that the oven bedplate heating system cannot be affected, in terms of temperature drift, by the resistor system of the oven vault.

BRIEF DESCRIPTION OF THE DRAWINGS

Further features and/or advantages of the present invention will become apparent in the light of the following description of a few embodiments thereof, supplied by way of non-limiting example with reference to the annexed drawings, wherein.

DESCRIPTION OF SOME PREFERRED EMBODIMENTS

Figure 1:
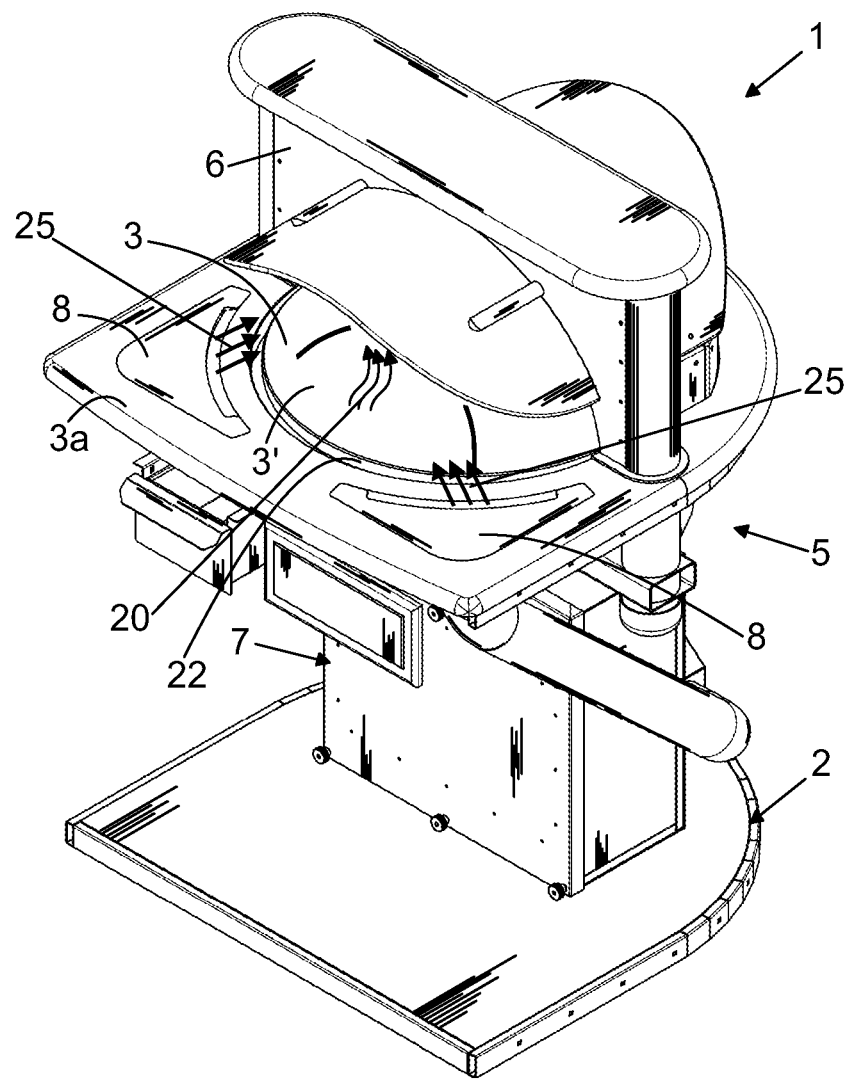
FIG. 1 is a perspective view of a grilling machine in accordance with the present invention.

With reference to FIG. 1, there is shown a grilling machine 1 according to the present invention, which comprises a base body 2, a plate 3, arranged on the base body 2, which defines a cooking surface 3' whereon the foods to be cooked are laid. It also comprises heating means 4 (FIG. 3) arranged under the plate 3 for heating the cooking surface 3' and a fumes treatment circuit 5, associated with the plate 3, for treating the fumes produced by the food cooking process.

Figure 2:
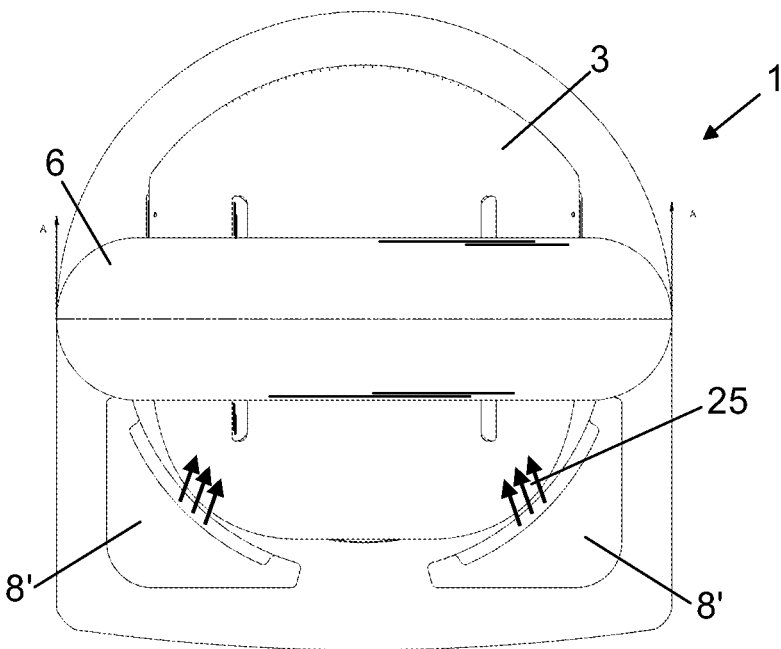
FIG. 2 is a top view of the grilling machine of FIG. 1.

In particular, the fumes treatment circuit 5 comprises a bridge-shaped hood 6 over the plate 3 that comprises at least one suction mouth 6' (FIG. 2), a filtering unit 7 fluidically connected to the hood 6, and a pair of recirculation outlets 8 fluidically connected to the filtering unit 7. The outlets 8 are positioned on opposite sides in a plane 3a that contains the plate 3. In this manner, the cooking fumes 20, shown schematically in the drawings, are taken in through the suction mouth 6' of the hood 6 and treated by the filtering unit 7 in order to obtain a purified flow 25 with a given percentage of humidity. The purified flow is then recirculated towards the cooking surface 3' through each recirculation outlet 8 in order to exert a humidifying action on the foods.

From a construction viewpoint, the filtering unit 7 is provided with a first filtering module 16 (FIG. 3) adapted to trap the first rougher parts, such as the greasy mist generated by the cooking process. For this purpose, impact filters, wire mesh filters and pleated and/or panel-type filtering septa made of fiber can be used, depending on the machine's size and application.

A second filtering module 17 consists of a set of filters 17' charged with activated charcoal or zeolites, which are adapted to absorb odours and purify the air to be reintroduced into the recirculation circuit of the machine.

More in particular, according to the principle of operation of the filtering unit 7, the fumes 20 are first sucked in by means of a suitably positioned centrifugal aspirator 18 (FIG. 4), which then recirculates downstream the air flow expelled by the recirculation outlets 8, appropriately arranged on the plane or base 3a, through suitable ducts 19. Thanks to the deflecting action of special removable plates 8' (FIG. 2), the air recirculation outlets 8 redirect the purified air flow 25 into the cooking region, thus ending the air recirculation process inside the machine.

As far as other construction aspects are concerned, the filtering unit 7 further comprises at least two condensate collection plugs 21 located downstream of the suction system 18. These plugs, which are commonly screw-type plugs, are easily removable for ordinary cleaning operations.

Figure 3:
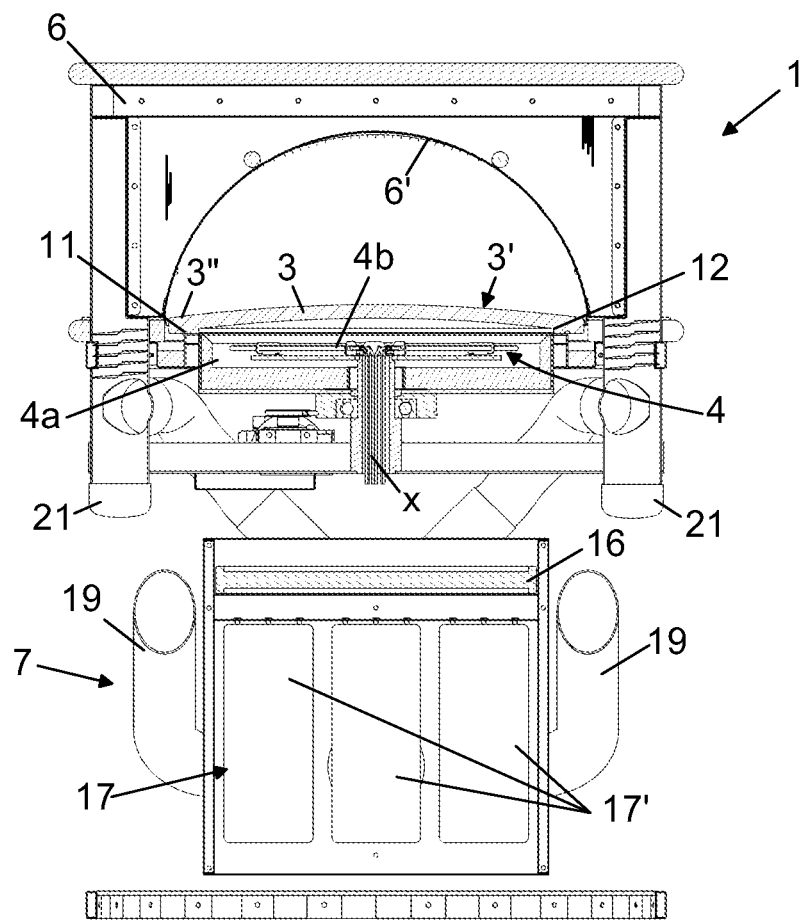
FIG. 3 is a sectional side view of the grilling machine of FIG. 1.

As shown in the sectional view of FIG. 3, in one embodiment the heating means 4 consist of electric or induction resistors housed underneath the plate 3. As an alternative or in combination, the heating means 4 may comprise a gas burner in the "combustion" version using charcoal, firewood or other fuels of vegetable nature or pellets or liquids, such as alcohol, of various nature.

More in particular, the system consists of a heating chamber 4a obtained from a perforated rotary tub equipped with an appropriately sealed rotary joint. The heating chamber 4a houses electric resistors 4b, or an autonomous induction heating system, or an (atmospheric or premixed) gas burner, or any other combustion and/or chemical heating system. The resistors 4b are therefore fixed, while the cooking plate 3 and the heating chamber 4b are free to rotate about a hollow axle x, through which the electric connections and/or any pipes supplying the heating system in use run integral with the machine body.

The rotary tub is internally coated with an insulating skirt, which is sufficiently thick to limit heat dissipation.

Figure 4:
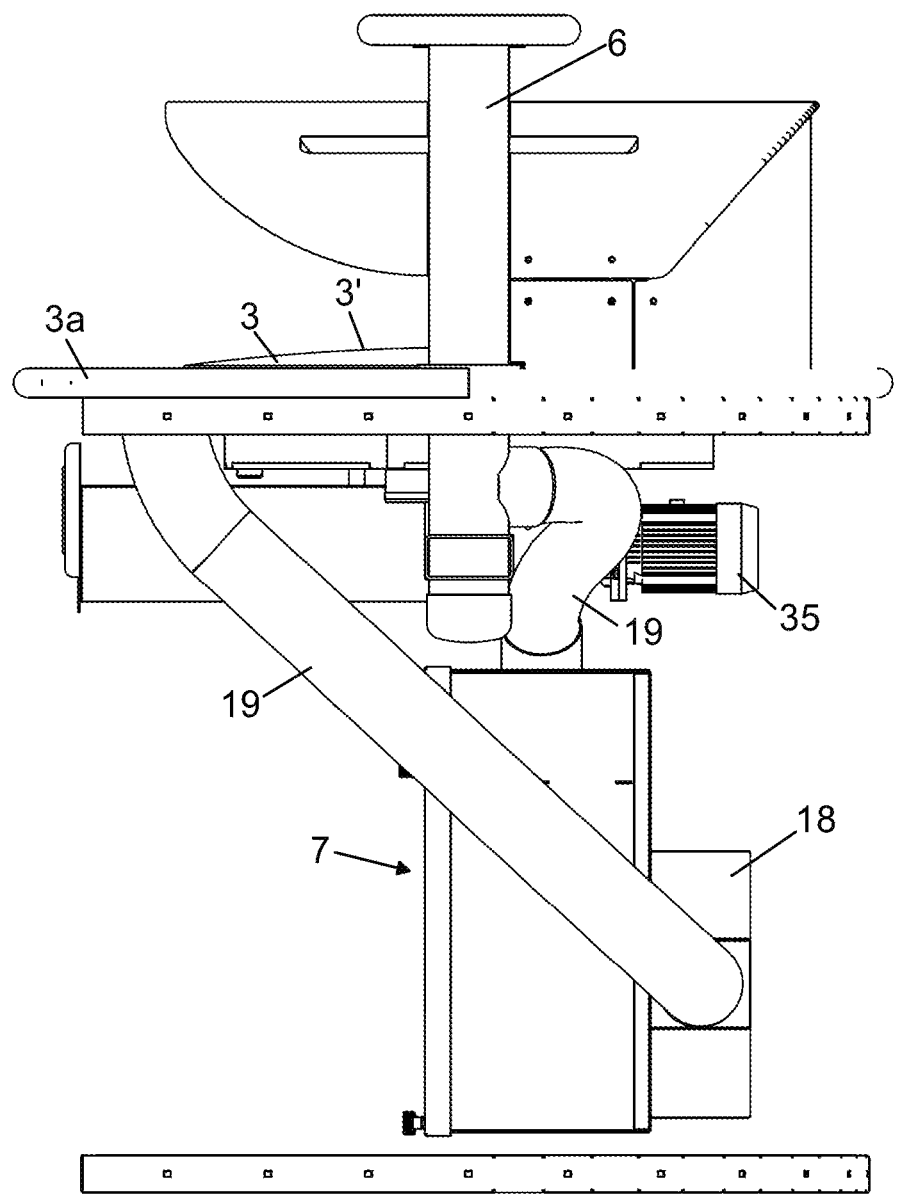
FIG. 4 is a side view of the grilling machine of FIG. 1.
Figure 5:
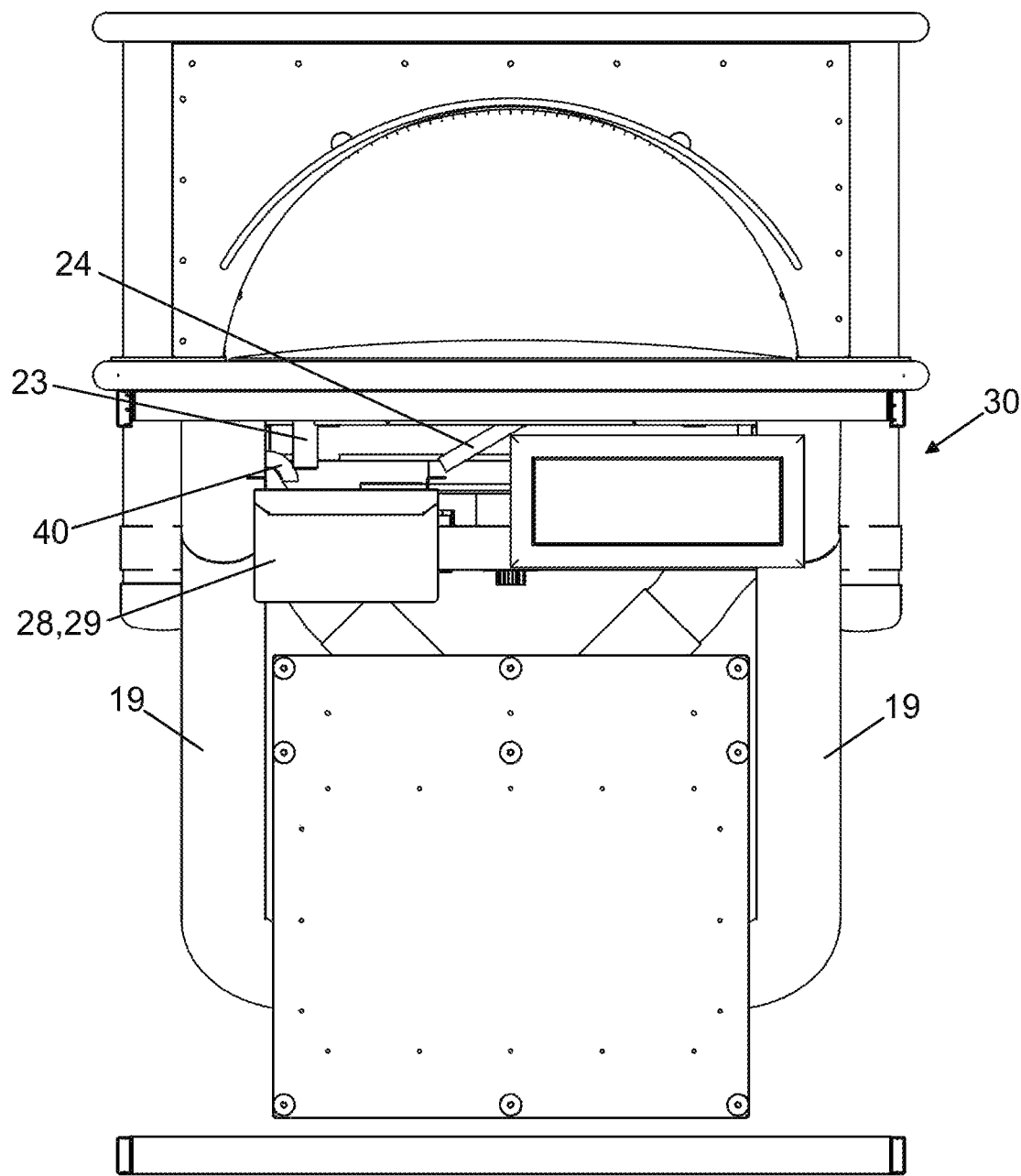
FIG. 5 is a front view of the grilling machine of FIG. 1 according to the present invention.

As shown in FIG. 3 and also in FIG. 4, the cooking plate 3 has a lenticular shape, with such a curvature as to allow the fats generated during the food cooking process to drain towards an outer edge 3" (FIG. 3) of the plate 3.

More in detail, the plate is made of soapstone or volcanic stone or other materials, such as metallic materials or cast iron with various surface finishes. It advantageously has a drop breaker lower recess 11 that prevents any backflow of liquids generated during the cooking process into the heating chamber underneath. The lenticular plate has a suitable thickness for its major diameter, so as to provide appropriate mechanical strength and uniform heat propagation, since it is concave also on its inner side.

In other variant embodiments, the plate may have other shapes suitable for specific cooking and/or browning results, whether flat, convex or concave, and possibly specially machined for facilitating and/or forming the product to be treated.

The plate 3 further comprises a profile 12, which seals the rotary heating chamber in its upper part, as shown in FIG. 3, i.e. forming with the latter a sealed shape coupling.

The plate is mounted on the plane and comprises a recirculation channel 22 associated with a recirculation circuit 30. In particular, the recirculation circuit comprises:

a delivery collector 24 fluidically connected to the drain channel 22;

a first tank 28 containing a detergent liquid, a pump associated with the first tank 28 and adapted to let a flow of detergent liquid into the drain and collection channel 22, and a return collector 40 fluidically connected to the drain channel 22 for collecting the cooking liquid mixed with the detergent liquid;

a second tank 29 for collecting the cooking liquid and the detergent liquid.

In the illustrated embodiment there is a single tank body in which two chambers are formed, which define the first tank 28 and the second tank 29.

There is also a drain pipe, connected to the tank and acting as an overflow device, so positioned and levelled as to operate by gravity. In this manner, the drain pipe will prevent any malfunctions deriving from a clogged intake and delivery circuit of the recirculation pump 35, which might cause an undesired increase in the level of the water in the drain channel 22. In other words, in the drain channel 22 there is a flow of water generated by the recirculation pump. The circuit of the drain channel 22 is equipped with a drain pipe acting as an overflow device. The delivery collector 24 is connected to the recirculation pump, while the liquid return collector 40 is discharged into the tank region delimited by a perforated grid fitted with a filtering septum, e.g. foam, not shown in detail. The delivery collector 24 is positioned under the normal operating level of the drain channel 22, with a suitable inclination for imparting to the liquid a circular motion within the same channel 22. The circular motion of the fluid is useful for exerting a detergent action on the drain channel 22. The recirculation pump is directly immersed in the underlying tank, with its intake mouth directly immersed in the liquid.

The tank of the machine, appropriately shaped and sized according to the machine's dimensions, is equipped with a maximum level indicator, so that it can be correctly filled up by the operator.

Said tank 28,29 can be extracted for the normal cleaning and filling operations to be carried out on a daily basis, depending however on machine usage.

The primary function of the recirculation channel 22 is to autonomously and constantly collect the greasy substances produced during the cooking process, so that the machine will be self-cleaning. A further function of the recirculation channel 22 is to humidify and flavour the foods being cooked; in fact, once the normal cooking temperature (max. 80-90°) has been reached, the resulting evaporative flow will be hit by the flow coming from the purified air recirculation outlet 9 and conveyed into the cooking region delimited by the glassware, thus humidifying the foods evenly during the cooking process.

To this end, only drinking water can be used as a liquid, possibly with the addition of appropriate amounts of lemon juice and chopped spices, to be placed into that part of the tank which contains the filtering septum.

For cleaning, it will suffice to add an adequate quantity of vinegar to the drinking water. According to another aspect of the invention, the above-described cooking machine can be operationally inserted into a chamber of an oven, e.g. like the one described in U.S. Pat. No. 1,363,393 filed by the present Applicant.

The cooking machine is arranged inside the oven and is sealed with respect to the oven chamber. The advantage that this provides is that the oven bedplate heating system cannot be affected, in terms of temperature drift, by the resistor system of the oven vault.

More specifically, the above-described solution overcomes the problem that the bedplate cannot settle to a constant temperature, because of the small internal height of the oven (approx. 16-18 cm). And the ventilation system, on which the thermal concept of the oven vault resistors is based, will tend to even out the internal temperature of the oven (including the bedplate), thus affecting the heating action exerted by the bedplate resistors.

In fact, the optimal bedplate temperature for cooking pizzas and/or the like is approx. 200-250 Celsius degrees, whereas the temperature of the flow generated by the vault resistors is higher by at least 120-150 degrees, or anyway not lower than 340-360 Celsius degrees.

This balance inside the oven, as originally conceived, cannot be maintained because the small internal height of the oven, combined with the ventilating action of the vault resistors, will tend to level the temperatures upwards, i.e. to the vault temperature, thus overheating the bedplate.

The arrangement of the grilling machine according to the present invention inside the oven chamber improves the thermal regulation of the bedplate considerably and reduces the energy consumption of the oven.

The above description of a number of specific embodiments has presented the invention from a conceptual viewpoint, so that others, by using known techniques, will be able to modify and/or adapt such specific embodiments to different applications without having to carry out further research and without departing from the inventive concept. It is therefore understood that any such adaptations and modifications will be considered as technical equivalents. The means and materials needed for implementing the different functions may be of various nature, without however departing from the scope of the invention. It is understood that the expressions and terminology used herein only serve a descriptive, non-limiting purpose.

The invention claimed is:

1. A grilling machine comprising:
   a base body;
   a plate arranged on said base body which defines a cooking surface whereon foods to be cooked are laid,
   a heat source operationally associated with said plate for heating said cooking surface;
   a circuit associated with said plate for treating fumes produced while cooking said foods;
   wherein said circuit comprises:
      a hood arranged over said plate in vertical and horizontal alignment therewith such that the hood is oriented parallel to said plate, the hood comprising at least one suction mouth;
      a filtering unit fluidically connected to said hood;
      a recirculation outlet fluidically connected downstream of said filtering unit and located near said plate;
      wherein the cooking fumes sucked in through said suction mouth of the hood are treated by said filtering unit in order to obtain a purified flow with a given percentage of humidity, wherein said purified flow is recirculated towards said cooking surface through said outlet in order to exert a humidifying action on the foods.

2. The grilling machine according to claim 1, wherein said hood is shaped as a bridge over said plate, and wherein the filtering unit is located, at least partly, under the cooking plate.

3. The grilling machine according to claim 1, wherein said filtering unit comprises:
   a first filtering module configured to filter greasy fluids produced by the cooking process; and
   a second filtering module, which in turn comprises a set of filters configured to absorb odors and purify air, in order to provide said purified flow in the circuit of the machine.

4. The grilling machine according to claim 3, wherein said first filtering module comprises filters selected from:
   impact filters,
   wire mesh filters,
   pleated and/or panel-type filtering septa made of fiber; or a combination thereof.

5. The grilling machine according to claim 3, wherein said second filtering module comprises activated charcoal or zeolite filters.

6. The grilling machine according to claim 3, wherein said filtering unit comprises a third filtering module which comprises an electrostatic filtering cell block equipped with an ionization section and a collector cell for filtering said cooking fumes in a continuous and fine manner.

7. The grilling machine according to claim 1, wherein a centrifugal aspirator associated with said filtering unit sucks in said cooking fumes and then recirculates said purified flow downstream of said filtering unit through said recirculation outlet.

8. The grilling machine according to claim 1 comprising means for condensate evacuation associated with the hood.

9. The grilling machine according to claim 1, wherein said heat source comprises a heating chamber obtained from a perforated rotary tub that comprises a rotary joint, wherein said heating chamber houses electric resistors, or an autonomous induction heating system, or a gas burner, so that said electric resistors, or autonomous induction heating system, or gas burner will stay in a fixed position, while said cooking plate and the heating chamber will be free to rotate about an axis defined by said rotary joint.

10. The grilling machine according to claim 9, wherein the rotary tub of the heating chamber is internally coated with an insulating skirt to limit heat dissipation.

11. The grilling machine according to claim 1, wherein said cooking plate has a lenticular shape.

12. The grilling machine according to claim 1, wherein said plate comprises a channel for collecting the liquids produced during the cooking process, wherein said channel is formed perimetrically at the edge of said plate.

13. The grilling machine according to claim 12, wherein the recirculation outlet is positioned near said channel of the plate, so that the evaporative flow of the liquids collected in the channel will be hit by the purified flow coming from the outlet.

14. The grilling machine according to claim 12, wherein a recirculation circuit is associated with said channel, said recirculation circuit comprising:
   a delivery collector fluidically connected to said channel;
   a first collection tank containing a detergent liquid;
   a pump associated with said first tank and adapted to deliver a flow of detergent liquid into said channel;
   a return collector fluidically connected to said channel for collecting the cooking liquid mixed with said detergent liquid;
   a second collection tank for collecting said cooking liquid and said detergent liquid.

15. The grilling machine according to claim 14 wherein a single tank comprises two distinct chambers that define said first tank and second tank.

16. The grilling machine according to claim 15, wherein a drain pipe is connected to said single tank, said drain pipe acting as an overflow device and being so arranged as to operate by gravity.

17. The grilling machine according to claim 1, which can be inserted into a rotary bedplate oven.

18. An oven for cooking foods comprising a bedplate, a vault and/or walls over the bedplate which delimit a cooking chamber, the oven comprising the grilling machine according to claim 1 inserted therein.

* * * * *